United States Patent [19]

Corvington et al.

[11] 4,232,489
[45] Nov. 11, 1980

[54] SKELETAL FRAME STRUCTURE WITH SHEET MATERIAL COVER

[75] Inventors: Edward J. Corvington, Cuyahoga Falls; Elmer J. Sitter, Northfield, both of Ohio

[73] Assignee: Royal Mark Laminates, Macedonia, Ohio

[21] Appl. No.: 53,103

[22] Filed: Jun. 28, 1979

[51] Int. Cl.² .......................... E04B 1/347; B32B 5/18; B32B 23/00
[52] U.S. Cl. .............................. 52/63; 52/86; 52/309.4; 428/77; 428/314; 428/315; 428/354
[58] Field of Search ............... 428/77, 40, 78, 41, 428/79, 314, 315, 343, 354, 310; 52/63, 86, 222, 309.4, 419, 420, 483

[56] References Cited

U.S. PATENT DOCUMENTS

| | | | |
|---|---|---|---|
| 2,143,955 | 1/1939 | McShane | 52/86 |
| 2,372,187 | 3/1945 | Davison | 52/86 |
| 3,121,649 | 2/1964 | Oliver | 52/420 |
| 3,262,827 | 7/1966 | Kallander et al. | 428/343 |
| 3,415,260 | 12/1968 | Hall | 52/63 |
| 3,840,266 | 10/1974 | Carlson | 428/310 |
| 4,039,709 | 8/1977 | Newman | 428/354 |
| 4,041,667 | 8/1977 | Lindner | 52/483 |
| 4,126,966 | 11/1978 | Lobell | 428/78 |

*Primary Examiner*—William J. Van Balen
*Attorney, Agent, or Firm*—Watts, Hoffmann, Fisher & Heinke Co.

[57] ABSTRACT

In a skeletal frame structure having a flexible sheet material cover, such as a greenhouse or the like, a protective tape applied to the frame below the cover to protect it from damage, the tape being characterized by a laminate of insulating plastic foam and a facing layer of silicone-coated kraft paper engageable by the cover.

6 Claims, 3 Drawing Figures

SKELETAL FRAME STRUCTURE WITH SHEET MATERIAL COVER

BACKGROUND OF THE INVENTION

The present invention relates generally to skeletal frame structures which have flexible covers, and more specifically to the improvement consisting of a new laminated tape that is applied to the frame for the purpose of protecting the cover from abrasion and other damage.

Skeletal frame structures with flexible covers are used as greenhouses, shrimp bed enclosures, and for various other purposes. These structures generally comprise a metal framework and a sheet of flexible material, such as polyethylene, polypropylene or the like, which is stretched over the framework to form a protective enclosure.

A problem with conventional constructions is that the cover can rub against the underlying metal frame when the wind blows, etc. The friction causes the relatively thin sheet material to wear so that the life of the cover is shortened. Another problem is that hot spots can be formed in the areas of a cover that contact a metal frame heated by the sun. The plastic material may melt in these areas so that the cover deteriorates rapidly.

One prior art attempt to guard against damage to the covers of skeletal structures was to apply strips of tape consisting of closed-cell polypropylene foam to the framework members. This expedient was not successful because the polypropylene foam tape quickly dried out in use when exposed to the ultraviolet rays in sunlight. When the cover came in contact with the exposed tape, the tape disintegrated and turned to powder.

SUMMARY OF THE INVENTION

The invention is primarily directed to the problems of protecting and improving the life of the flexible sheet material covers of skeletal frame structures, such as greenhouses and the like. The prior art problems have been overcome and the objective of the invention has been achieved by the provision of a skeletal frame tape which insulates the cover from the underlying metal framework and provides a cover-engaging surface having a low coefficient of friction.

In a preferred embodiment the invention generally comprises a skeletal frame structure including a framework and a flexible cover, and is particularly directed to the improvement characterized by a protective tape applied to the framework beneath the cover, the tape comprising a laminate of plastic foam and a facing layer of silicone-coated kraft paper engageable by the cover.

Preferably, the plastic foam is foamed polypropylene and is provided with an adhesive coating in order to secure the tape to the framework.

The application of the tape to a skeletal framework so that the silicone-coated side is up minimizes abrasion and consequent wear of the overlying flexible sheet material cover. The silicone coating provides another important function in that it acts as an ultraviolet inhibitor. It protects the foam substrate from the ultraviolet rays in sunlight which can cause the foam to dry out and disintegrate. The foam layer of the tape insulates the cover from the framework to prevent the occurrence of hot spots in the cover and melting of the plastic material.

Other features, advantages and a fuller understanding of the invention will be had from the following detailed description taken in conjunction with the accompanying drawing.

DESCRIPTION OF THE PREFERRED EMBODIMENT

Figure 1:
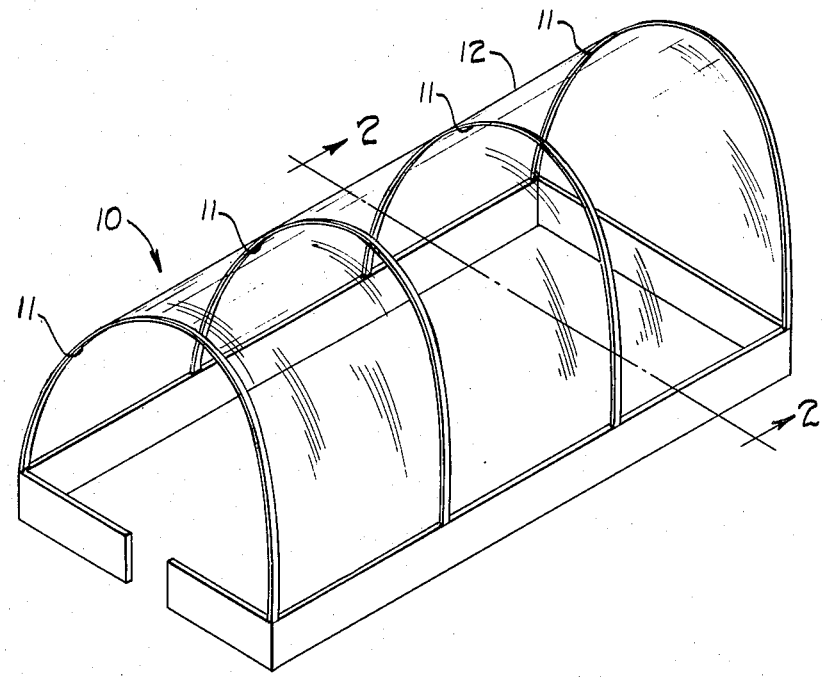
FIG. 1 is a schematic, perspective view of a temporary greenhouse constructed in accordance with the teaching of this invention.
Figure 2:
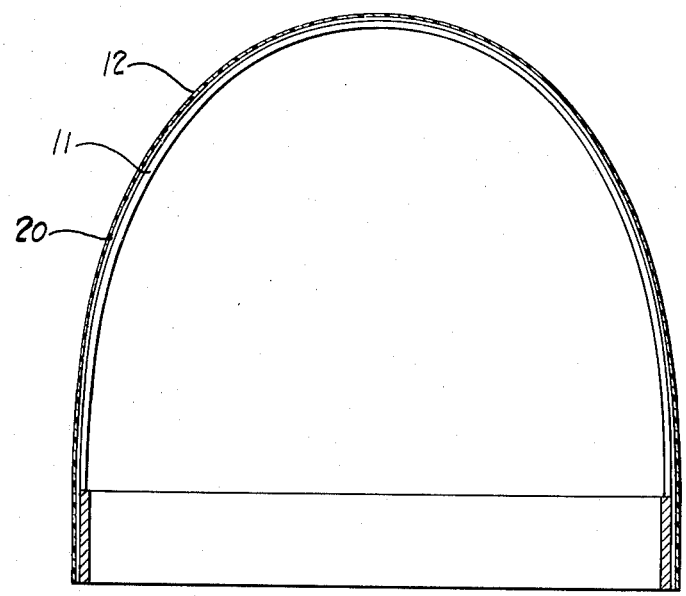
FIG. 2 is an enlarged, cross-sectional view taken generally on the line 2—2 of FIG. 1.

Referring to FIGS. 1 and 2, the illustrated greenhouse is indicated generally by reference numeral 10 and includes a plurality of spaced, arched frame members or ribs 11. The ribs 11 support a cover 12 of flexible sheet material. As indicated in FIG. 2, the cover 12 is pulled over the supporting ribs 11 and is anchored along the lower side edges of the greenhouse 10. The flexible cover 12 is formed of any suitable plastic sheet material, such as reinforced polyethylene or the like.

Figure 3:
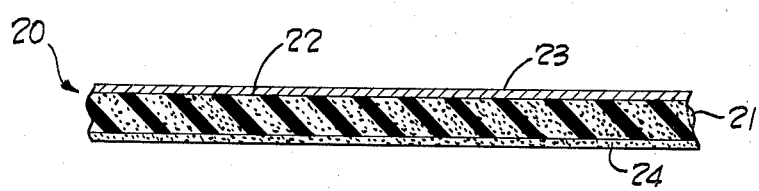
FIG. 3 is an enlarged, fragmentary, cross-sectional view of the protective tape.

In accordance with the present invention, a strip of tape 20 is applied to each of the ribs 11 beneath the cover 12 in order to prevent it from being damaged by contact with the ribs. A preferred embodiment of the tape 20 illustrated in FIG. 3 comprises a laminate of plastic foam 21 and a facing layer 22 of kraft paper. The exposed surface 23 of the kraft paper 22 is coated with silicone. The other surface of the foam 21 is shown as being provided with an adhesive coating 24 suitable for securing the tape 20 to the ribs 11.

The plastic foam 21 is preferably a foamed polypropylene which may be on the order of from one-sixteenth of an inch to one-quarter of an inch in thickness. In a typical application, the silicone-coated kraft paper may be 60 or 65 pound weight paper. Any suitable adhesive may be used to form the coating 24, although a pressure sensitive adhesive, such as a rubber or acrylic base composition, is preferred.

When applied to the ribs 11 of a greenhouse structure such as shown in FIG. 1, the silicone-coated kraft paper 22 is engageable by the flexible sheet material cover 12 and provides a reduced coefficient of friction which minimizes abrasion and consequent wear of the cover. The silicone coating on the kraft paper also functions as an ultraviolet inhibitor to prevent the foam 21 from being dried out when exposed to ultraviolet rays in sunlight. The plastic foam 21 insulates the ribs 11 to prevent hot spots from being created in the cover 12 with consequent melting of the plastic material.

It is to be understood that the invention is not limited to the construction of greenhouses, and that the particular structure shown in FIG. 1 was chosen only for the purpose of describing an examplary arrangement in which the invention can be used to advantage. The same or similar advantages can be realized in other skeletal frame structures employing flexible covers.

Various modifications and variations of the invention will be obvious to those skilled in the art in light of the foregoing detailed disclosure. Therefore, it is to be understood that, within the scope of the appended claims, the invention can be practiced otherwise than as specifically shown and described.

What is claimed is:

1. In a skeletal frame structure including a framework and a flexible cover, the improvement characterized by a protective tape applied to the framework beneath the cover, said tape comprising a laminate of plastic foam and a facing layer of silicone-coated kraft paper, said facing layer being exposed for contact by the cover.

2. The improvement as claimed in claim 1 including an adhesive coating securing said tape to said framework.

3. In a skeletal frame structure including a framework and a flexible sheet material cover, the improvement characterized by a protective tape applied to the framework beneath the cover, said tape comprising a laminate of polypropylene foam and a facing layer of silicone-coated kraft paper engageable by the cover, and an adhesive coating on said foam securing said tape to the framework.

4. Skeletal frame tape comprising a laminate of plastic foam and a facing layer of silicone-coated kraft paper.

5. A tape as claimed in claim 4 wherein said plastic foam is foamed polypropylene.

6. A tape as claimed in claim 4 or claim 5 including an exposed adhesive coating.

* * * * *